US012705268B2

(12) United States Patent
Chhatpar

(10) Patent No.: US 12,705,268 B2
(45) Date of Patent: Aug. 11, 2026

(54) APPARATUS, METHOD, AND COMPUTER PROGRAM PRODUCT FOR DISTRIBUTED SEMANTIC SEARCH

(71) Applicant: Honeywell International Inc., Charlotte, NC (US)

(72) Inventor: Pavan Ravindra Chhatpar, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 289 days.

(21) Appl. No.: 18/194,100

(22) Filed: Mar. 31, 2023

(65) Prior Publication Data

US 2024/0330342 A1 Oct. 3, 2024

(51) Int. Cl.

*G06F 16/334* (2025.01)
*G06F 16/31* (2019.01)
*G06F 16/338* (2019.01)

(52) U.S. Cl.

CPC ........ *G06F 16/3347* (2019.01); *G06F 16/313* (2019.01); *G06F 16/338* (2019.01)

(58) Field of Classification Search

None

See application file for complete search history.

(56) References Cited

U.S. PATENT DOCUMENTS 6,728,728 B2 * 4/2004 Spiegler ................ G06F 16/284 707/999.103
8,788,525 B2 * 7/2014 Neels .................... G06F 16/248 707/765
8,788,526 B2 * 7/2014 Neels .................. G06F 16/9535 707/765
10,467,243 B2 * 11/2019 Liu ....................... G06F 16/282
10,726,016 B2 * 7/2020 Chavan ............... G06F 16/3347
10,747,206 B2 * 8/2020 Dhakshinamoorthy ..................... G06F 16/24522
10,878,012 B2 * 12/2020 Dhakshinamoorthy ..................... G06F 16/335
11,226,955 B2 * 1/2022 Liu ..................... G06F 16/2255
11,768,837 B1 * 9/2023 Newman .................. G06N 5/02 707/722
11,836,595 B1 * 12/2023 Yang ...................... G06N 3/082
2013/0311487 A1 * 11/2013 Moore .................... G06F 40/30 707/E17.084
2017/0293687 A1 * 10/2017 Kolotienko ............. G06F 40/30
2020/0142989 A1 * 5/2020 Bordawekar ..... G06F 16/24556
2020/0311077 A1 * 10/2020 Zhang ..................... G06F 3/068
2021/0081462 A1 * 3/2021 Lu ..................... G06F 16/90339

(Continued)

*Primary Examiner* — Raquel Perez-Arroyo
*Assistant Examiner* — Jessica N Le
(74) *Attorney, Agent, or Firm* — ALSTON & BIRD LLP

(57) ABSTRACT

A distributed semantic search system conducts semantic searches with respect to a master corpus via a plurality of semantic search nodes. A main text data set representing the master corpus is partitioned into node text data sets, each corresponding to a semantic search node. A node index is generated for each semantic search node based on the corresponding node text data set. Each semantic search node is provisioned with the node index and a local instance of a semantic search process. An input query vector is broadcast to all of the semantic search nodes, each of which executes the corresponding instance of the semantic search process based on the corresponding node index, outputting resulting node results sets, which are combined to produce a master results set.

12 Claims, 6 Drawing Sheets

(56) References Cited

U.S. PATENT DOCUMENTS

| | | | | |
|---|---|---|---|---|
| 2022/0083914 | A1* | 3/2022 | Okamoto | G06N 20/00 |
| 2022/0261544 | A1* | 8/2022 | Vasudevan | G06F 16/35 |
| 2022/0345543 | A1* | 10/2022 | Oleinikov | G06Q 10/06393 |
| 2022/0358163 | A1* | 11/2022 | Makhija | G06F 16/3344 |
| 2023/0214412 | A1* | 7/2023 | Short | G06F 16/3344<br>707/711 |
| 2023/0245171 | A1* | 8/2023 | Niu | G06Q 30/0256<br>705/14.55 |
| 2023/0281236 | A1* | 9/2023 | Zeichner | G06F 40/279<br>707/739 |
| 2024/0193196 | A1* | 6/2024 | Zhu | G06F 16/3346 |

* cited by examiner

APPARATUS, METHOD, AND COMPUTER PROGRAM PRODUCT FOR DISTRIBUTED SEMANTIC SEARCH

TECHNICAL FIELD

Embodiments of the present disclosure generally relate to semantic search, and specifically, in some examples, to performing semantic search operations within an enterprise management context.

BACKGROUND

Applicant has identified example technical challenges and difficulties associated with current solutions for semantic search. Through applied effort, ingenuity, and innovation, Applicant has solved problems relating to performing semantic search operations within an enterprise management context.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: partition a main text data set representing a master corpus into a plurality of node text data sets each representing a portion of the master corpus based at least in part on a predefined partitioning schema, with each node text data set of the plurality of node text data sets corresponding uniquely to a semantic search node of a plurality of semantic search nodes; for each semantic search node of the plurality of semantic search nodes, generate a corresponding node index based at least in part on the node text data set corresponding to the semantic search node; receive a query vector representing input for a semantic search over the master corpus; at each semantic search node of the plurality of semantic search nodes, generate a node results set representing output of a semantic search over the portion of the master corpus represented by the node text data set corresponding to the semantic search node by executing a corresponding instance of a semantic search process based at least in part on the query vector and on the node index corresponding to the semantic search node; and generate a master results set representing output of a semantic search over the master corpus by combining a plurality of node results sets comprising the node results set generated at each semantic search node of the plurality of semantic search nodes.

In some embodiments, the at least one non-transitory memory and the program code are configured to, with the at least one processor, further cause the apparatus to at least, at each semantic search node of the plurality of semantic search nodes, load the node index corresponding to the semantic search node into a persistent node index cache of the semantic search node.

In some embodiments, each node results set of the plurality of node results sets comprises a top-k set of ranked results determined by the instance of the semantic search process corresponding to the semantic search node at which the node results set is generated, and combining the plurality of node results sets comprises determining a top-k set of the ranked results from all of the node results sets in the plurality of node results sets.

In some embodiments, the at least one non-transitory memory and the program code are configured to, with the at least one processor, further cause the apparatus to at least store in a node index store a plurality of node indexes comprising the node index generated for each semantic search node of the plurality of semantic search nodes. This node index store may be configured to store the plurality of node indexes in a file according to a columnar file format.

In some embodiments, the predefined partitioning schema is configured such that the portion of the master corpus represented by each node text data set of the plurality of node text data sets is determined based at least in part on time data, region data, and/or categories associated with each discrete object in the master corpus.

In some embodiments, generating the node index corresponding to each semantic search node of the plurality of semantic search nodes comprises: generating, for each semantic search node of the plurality of semantic search nodes, a node vector set corresponding to the semantic search node based at least in part on the node text data set corresponding to the semantic search node by embedding text from the corresponding node text data set using a trained language model; and generating the node index corresponding to each semantic search node of the plurality of semantic search nodes based at least in part on the corresponding node vector set.

In some embodiments, the at least one non-transitory memory and the program code are configured to, with the at least one processor, further cause the apparatus to at least tune the trained language model for optimal compatibility with the semantic search process based at least in part on hyperparameters and sample query data comprising labeled semantic search inputs.

In some embodiments, the at least one non-transitory memory and the program code are configured to, with the at least one processor, further cause the apparatus to at least: select, from a plurality of index structures associated with the semantic search process, an optimal index structure based at least in part on hyperparameters associated with the plurality of index structures; and generate the node index corresponding to each semantic search node of the plurality of semantic search nodes according to the selected optimal index structure.

In some embodiments, the main text data set representing the master corpus comprises aggregated enterprise data collected by an enterprise management system with respect to one or more systems associated with an enterprise, the query vector is generated based at least in part on semantic search request input received via a semantic search request interface presented via the enterprise management system, and the enterprise management system is configured to, in response to receiving the master results set perform one or more enterprise management operations with respect to the one or more systems associated with the enterprise based at least in part on the master results set.

According to another aspect, embodiments of the present invention feature a method comprising: partitioning a main text data set representing a master corpus into a plurality of node text data sets each representing a portion of the master corpus based at least in part on a predefined partitioning schema, wherein each node text data set of the plurality of node text data sets corresponds uniquely to a semantic search node of a plurality of semantic search nodes; for each semantic search node of the plurality of semantic search nodes, generating a corresponding node index based at least in part on the node text data set corresponding to the semantic search node; receiving a query vector representing input for a semantic search over the master corpus; at each semantic search node of the plurality of semantic search nodes, generating a node results set representing output of a semantic search over the portion of the master corpus represented by the node text data set corresponding to the semantic search node by executing a corresponding instance of a semantic search process based at least in part on the query vector and on the node index corresponding to the semantic search node; and generating a master results set representing output of a semantic search over the master corpus by combining a plurality of node results sets comprising the node results set generated at each semantic search node of the plurality of semantic search nodes.

According to another aspect, embodiments of the present invention feature a computer program product comprising at least one non-transitory computer-readable storage medium having computer-readable program code portions stored therein. The computer-readable program code portions comprise an executable portion configured to: partition a main text data set representing a master corpus into a plurality of node text data sets each representing a portion of the master corpus based at least in part on a predefined partitioning schema, with each node text data set of the plurality of node text data sets corresponding uniquely to a semantic search node of a plurality of semantic search nodes; for each semantic search node of the plurality of semantic search nodes, generate a corresponding node index based at least in part on the node text data set corresponding to the semantic search node; receive a query vector representing input for a semantic search over the master corpus; at each semantic search node of the plurality of semantic search nodes, generate a node results set representing output of a semantic search over the portion of the master corpus represented by the node text data set corresponding to the semantic search node by executing a corresponding instance of a semantic search process based at least in part on the query vector and on the node index corresponding to the semantic search node; and generate a master results set representing output of a semantic search over the master corpus by combining a plurality of node results sets comprising the node results set generated at each semantic search node of the plurality of semantic search nodes.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
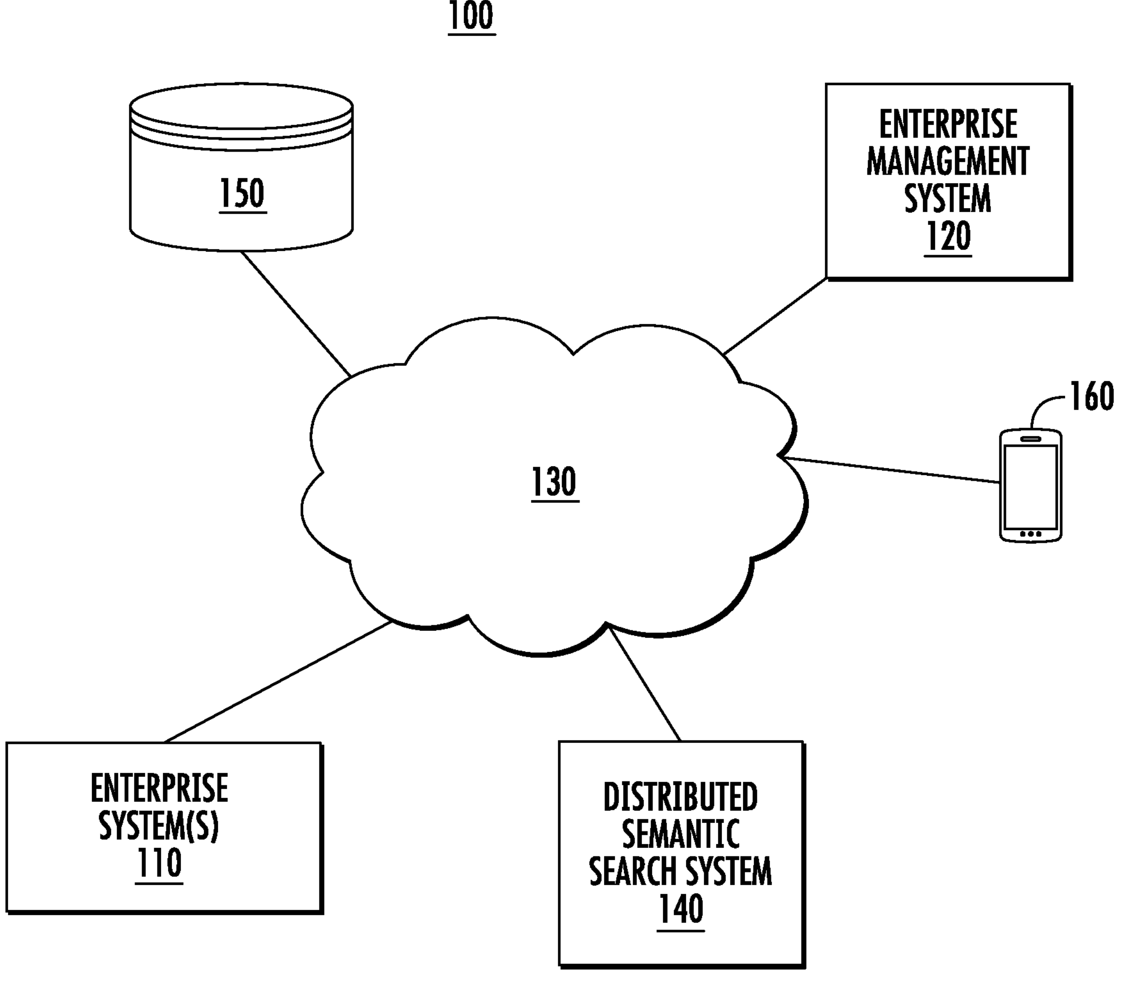
Figure 2:
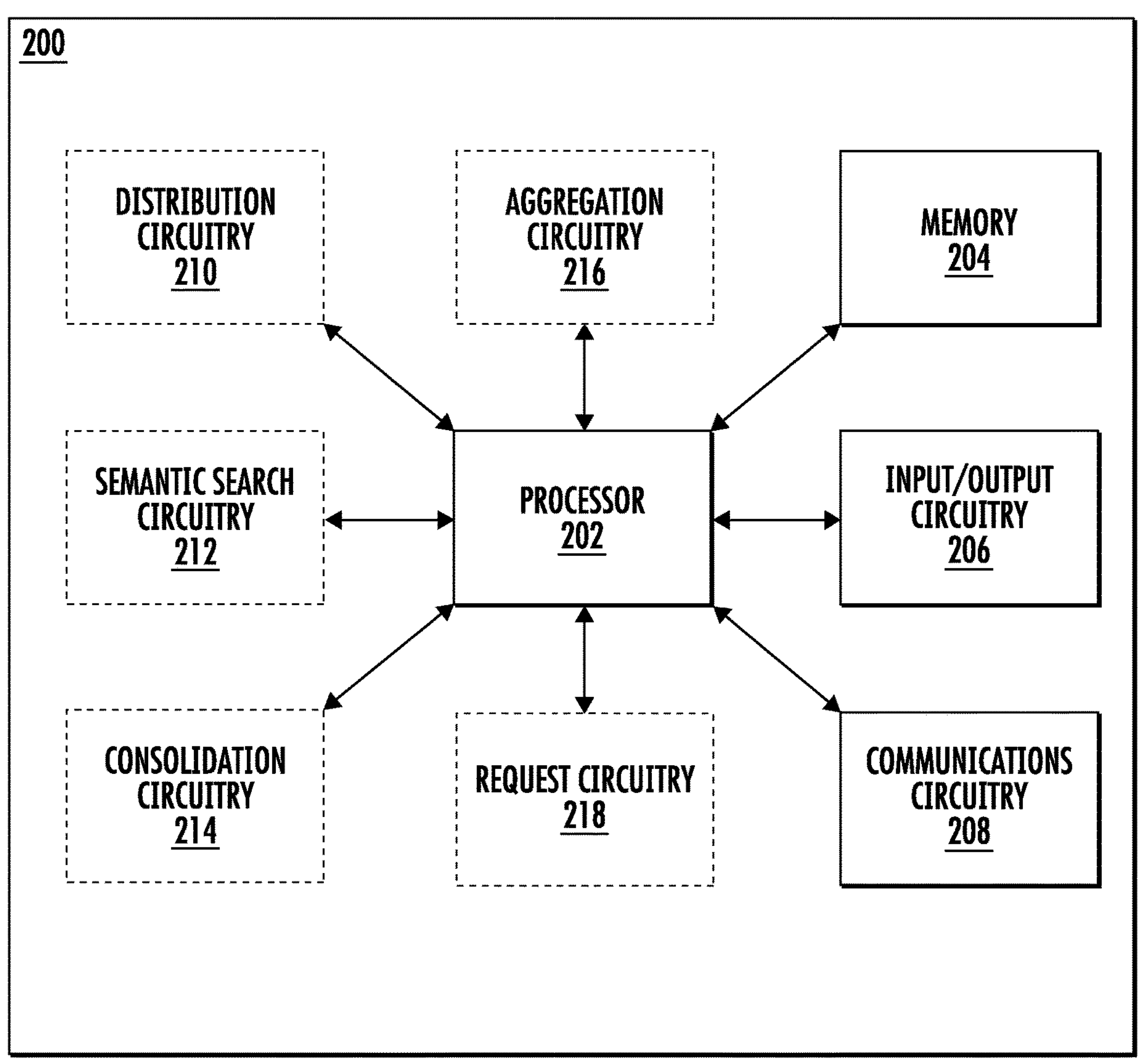
Figure 3:
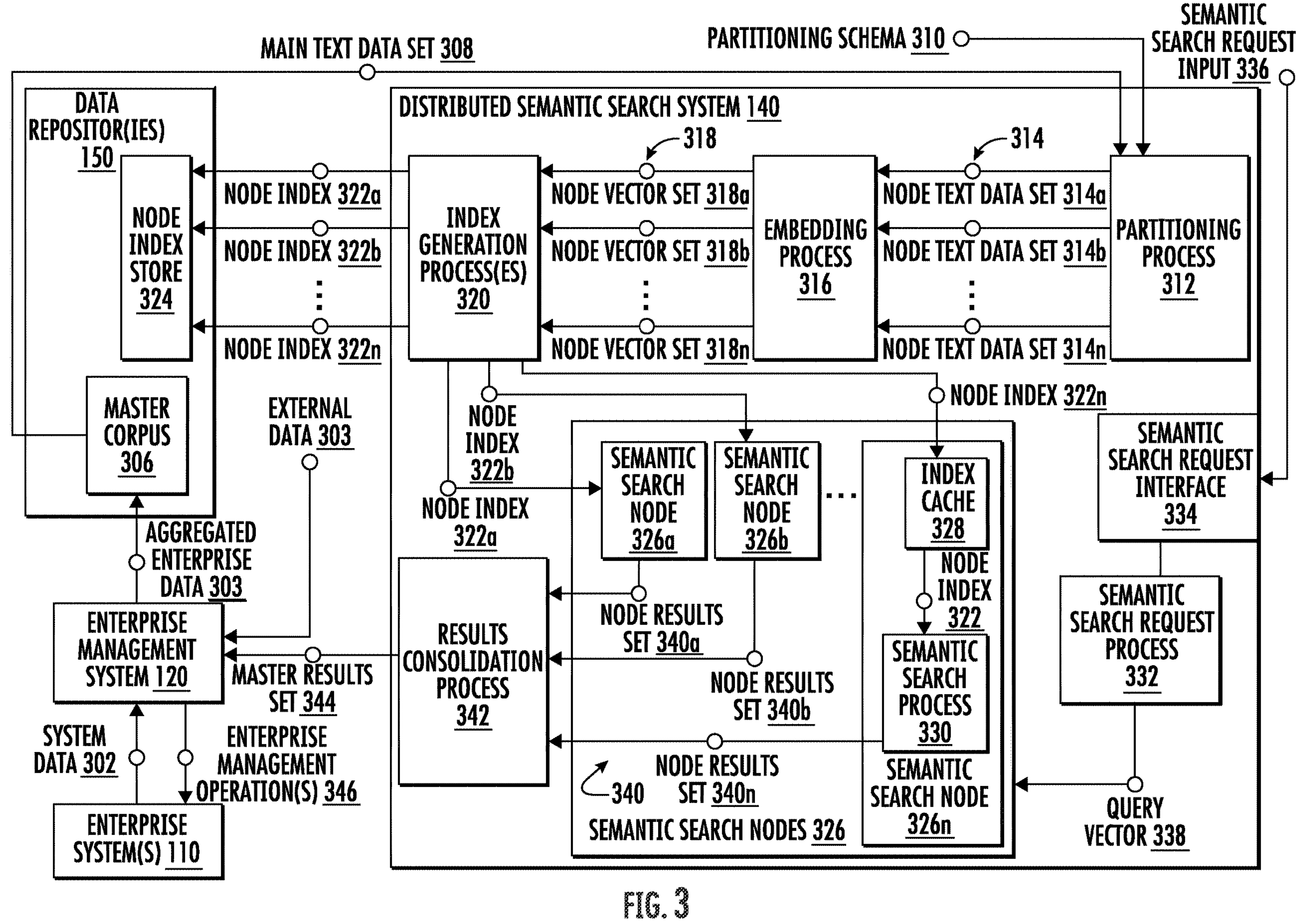
Figure 4:
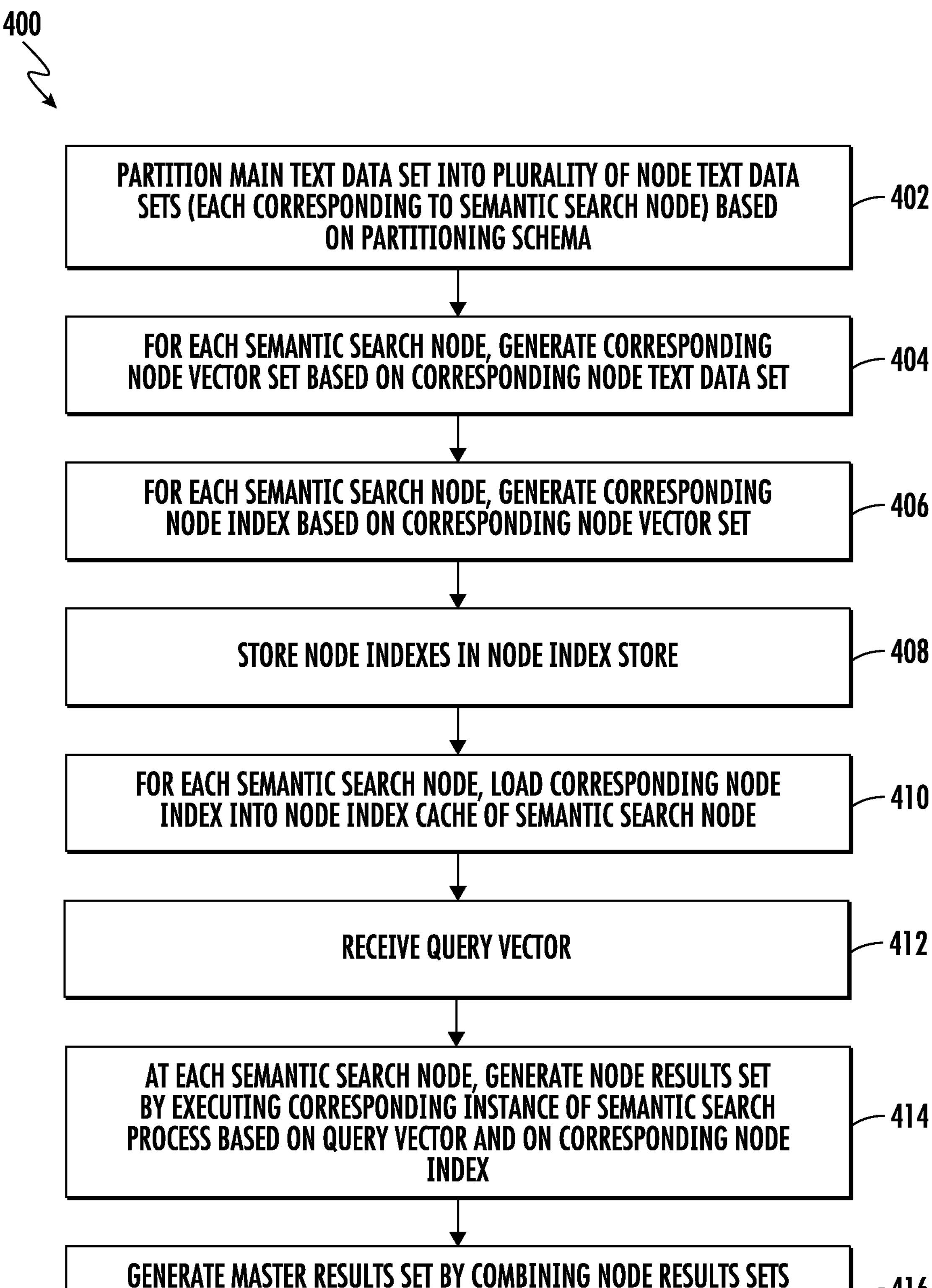
Figure 5:
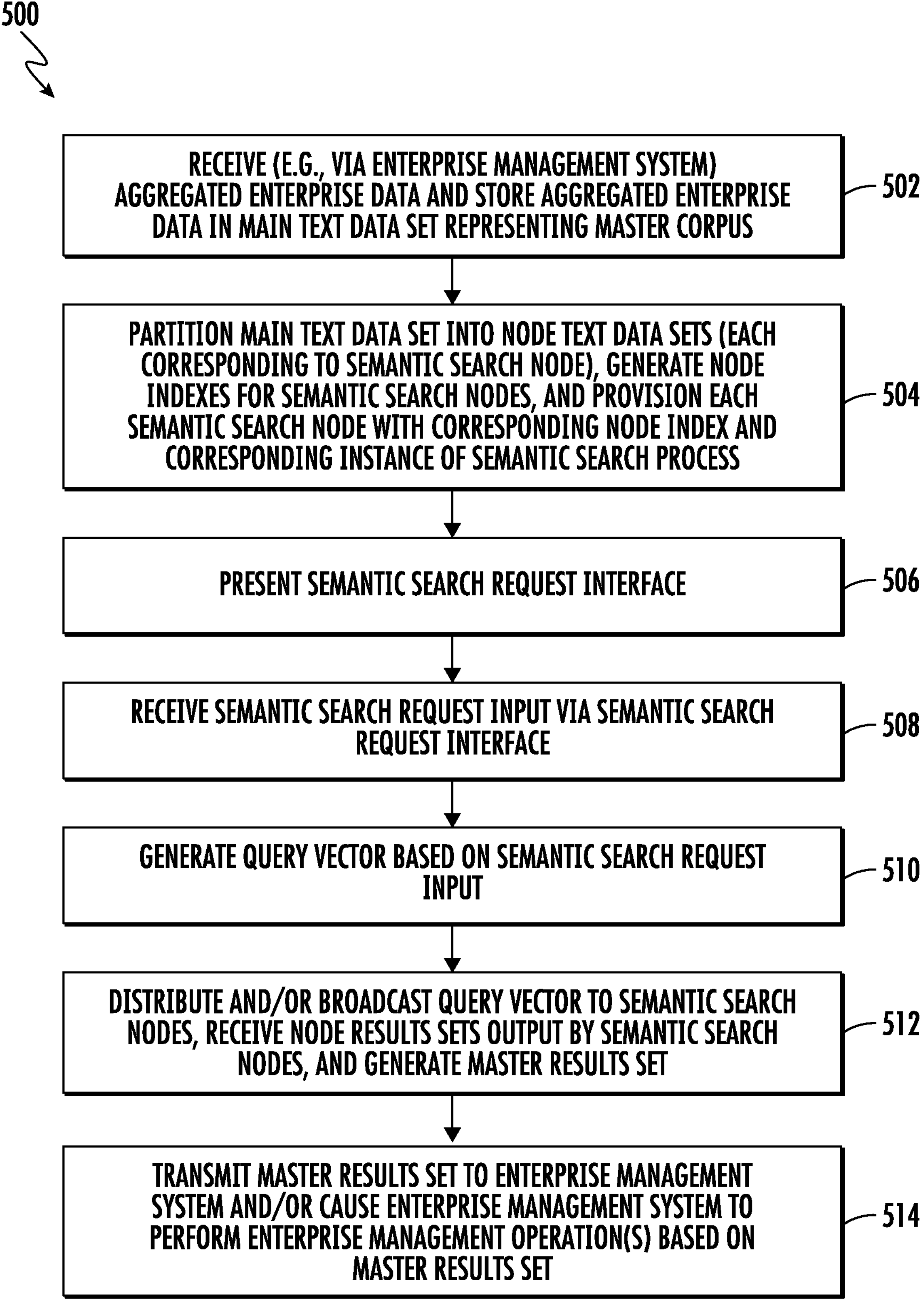
Figure 6:
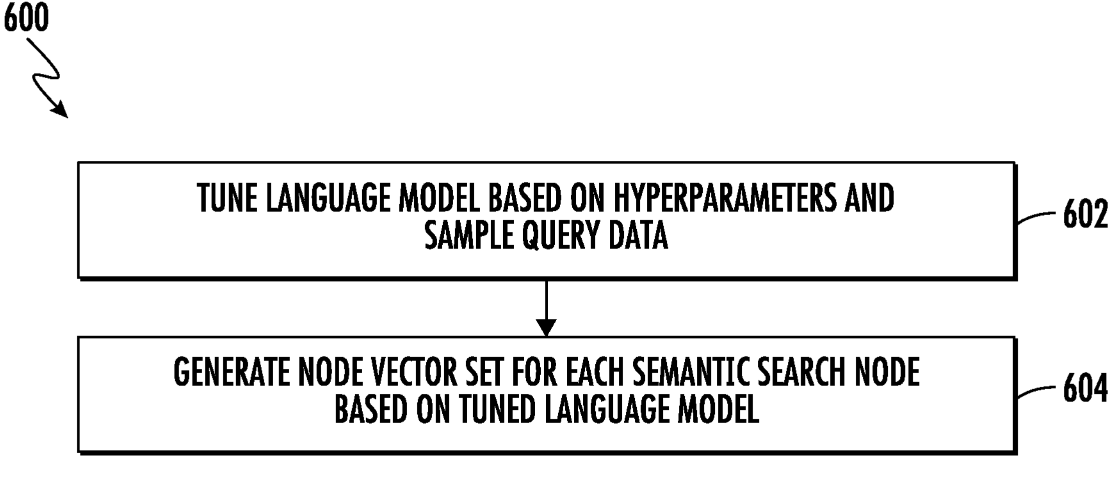
Figure 7:
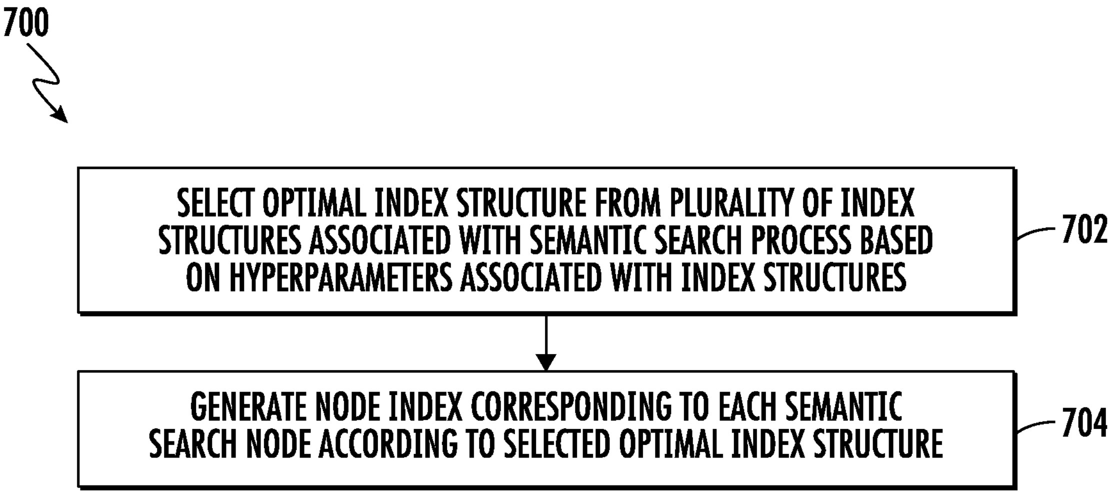

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary distributed semantic search system, in accordance with at least some example embodiments of the present disclosure;

FIG. 4 is a flowchart depicting an example process for performing a distributed semantic search with respect to a master corpus, in accordance with at least some example embodiments of the present disclosure;

FIG. 5 is a flowchart depicting an example process for performing a distributed semantic search specifically in an enterprise management context, in accordance with at least some example embodiments of the present disclosure;

FIG. 6 is a flowchart depicting an example process for tuning a language model to generate node vector sets, in accordance with at least some example embodiments of the present disclosure; and FIG. 7 is a flowchart depicting an example process for selecting an optimal index structure for generating node indexes, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might"

(or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Entities such as businesses or other organizations may have and/or may be responsible for maintaining enterprise systems of various types, including operational systems and/or computer, software, and/or network systems, to list a few examples.

Operational systems of and/or maintained by an enterprise may include building systems (e.g., heating, ventilation, and air conditioning (HVAC) systems, building automation systems, security systems) and/or industrial systems (e.g., manufacturing systems, sorting and distribution systems). These operational systems are configured, in some examples, to monitor and/or control various physical aspects of a premises, building, site, location, environment, mechanical system, industrial plant or process, laboratory, manufacturing plant or process, vehicle, utility plant or process, and/or the like. An operational system comprises various assets, including, in some examples, equipment (e.g., controllers, sensors, actuators) configured to perform the functionality attributed to the operational system and/or components, devices, and/or subsystems of the operational system. In some examples, the operational system, via its various assets, may monitor and/or control operation of a residential or commercial building or premises (e.g., HVAC systems, security systems, building automation systems, and/or the like). In other examples, the operational system may monitor and/or control operation of a manufacturing plant (e.g., manufacturing machinery, conveyor belts, and/or the like). In yet other examples, the operational system may monitor and/or control operation of a vehicle.

In another example, computer, software, and/or network systems of and/or managed by an enterprise may include one or more enterprise networks (e.g., comprising user devices, server devices, and/or networking devices connected to each other via one or more networks), one or more cloud-based or on-site, centralized and/or distributed software systems, content management systems, knowledge management systems, project management systems, customer relationship management systems, human resources management systems, and/or any systems associated with internal and/or external processes and/or operations of an enterprise.

These various enterprise systems of and/or managed by enterprises may generate data of various types, and an enterprise that has and/or is responsible for managing such enterprise systems often generates, collects, and/or accumulates a body of enterprise data that may contain data from and/or associated with any or all of the enterprise systems associated with the enterprise systems and/or any processes and/or operations of the enterprise.

In one example scenario, a given enterprise may be responsible for the management of several operational systems, across several sites and locations, each comprising several (e.g., possibly thousands) of assets. Management of such systems often includes monitoring conditions and/or performance of the systems' assets, facilitating and/or performing service on or physical maintenance of the assets, and/or controlling the assets in order to optimize the assets' and systems' performance and/or fulfill other objectives of the enterprise.

Enterprise management systems, such as enterprise performance management (EPM) systems, have been proposed to monitor and maintain enterprise systems, including, in one example, operational systems. For example, in some operational systems, it has been proposed to communicatively connect the operational system(s), including assets of the operational system(s), to a remote monitoring system (e.g., a cloud platform) configured to aggregate enterprise data (e.g., operational data) with respect to some or all of the assets of one or more operational systems (e.g., deployed at one or more sites or locations). This operational data may comprise sensor data (e.g., generated via assets such as sensors of the operational system) or any other data generated with respect to and/or describing operation of the operational systems and/or assets thereof. The monitoring system may also aggregate and/or maintain other types of enterprise data, such as operational system context data defining various attributes (e.g., relationships, types, locations, roles) associated with the assets of the operational system and other objects associated with the operational system. This operational data and operational system context data may be collected, archived, and consulted in order to provide visibility into and perform various control operations with respect to the operational system(s), for example. These monitoring systems may be configured to provide, for each enterprise, an enterprise-wide, top-to-bottom, historical and/or real-time, view of the status of various processes, assets, people, and/or other objects associated with all of the operational system(s) managed by the enterprise. The monitoring systems may be configured to generate and present insights (e.g., predictions and/or recommendations) for optimizing performance of the operational system(s) and assets thereof. These insights are often generated using machine learning models, which may be developed, configured, and/or trained using one or more machine learning algorithms.

In another example, it may be possible to communicatively connect other types of enterprise systems, including any computer, software, and/or network systems of or managed by an enterprise, to an enterprise management system configured to receive, collect, generate, and/or access enterprise data associated with the computer, software, and/or network systems with respect to some or all of the equipment, devices, processes, operations, knowledge, products, services, users, employees, customers, markets, campaigns, and/or performance associated with any or all of the various systems and internal or external processes and/or operations implemented, managed, and/or facilitated by said systems.

In yet another example, enterprises (e.g., via enterprise management systems or other enterprise systems) may have access to one or more external sources of data that may be related to and/or useful for the various systems and internal or external processes and/or operations of the enterprises. Some or all of the enterprise data maintained by an enterprise may be collected and/or accessed from these external sources, including public archives, databases, research indexes, and/or other bodies of data, which may be publicly available or otherwise provided to the enterprise.

In one example scenario, some or all of the enterprise data collected by an enterprise may comprise text data. In some cases, the text data comprises text data organized into one or more discrete items of text data such as documents, articles, memoranda, manuals, posts, messages, and/or pages, to list a few examples. The enterprise data may comprise any type of text data in any form, but for the purposes of illustration, some examples of text data included in the enterprise data that can be received, collected, generated, and/or accessed (e.g., via an enterprise management system) may include technical documentation and/or manuals (e.g., associated with configuration and/or functioning of various equipment and/or assets of enterprise systems), documentation and/or manuals associated with internal processes or operations of the enterprise, internal or external communications and/or correspondence between various entities within and/or outside of the enterprise, contracts or legal agreements between various entities within and/or outside of the enterprise, any documents or records associated with legal and/or regulatory proceedings associated with the enterprise, any documents or records associated with intellectual property protection proceedings associated with the enterprise, any web content published and/or distributed via one or more enterprise systems, user-generated content generated within and/or via one or more enterprise systems, any files or records of the enterprise and/or enterprise systems, published written works such as books, magazines, journals, and/or articles, and/or web content including articles, blog posts, social media posts, forum posts, reviews, and/or web pages, among other examples.

The ability to conduct searches against large bodies of text data accumulated by an enterprise would be useful, for example, as part of an enterprise management system. Especially useful would be semantic search or similarity search capability. Semantic search may refer to searching functionality that accounts for an underlying meaning both of the search terms or queries being searched for within a body of data and the body of data being searched (as opposed to lexical search, which involves finding literal matches between queries and data being searched). Some semantic search processes for performing such semantic searches have been proposed and/or developed. One example of a semantic search process is Facebook AI Similarity Search (FAISS), which is an open source library produced by Meta AI (formerly Facebook AI) of Meta Platforms, Inc. FAISS includes various functions that can be used to generate an index corresponding to a body of text and perform semantic search operations with respect to the body of text (via the index). Advantages of the semantic search process implemented via the FAISS library include high efficiency, speed, and performance. For example, FAISS enables fast semantic searching over a large body of text data (represented as vectors) by creating an index over the text data according to a variety of available index formats.

However, some semantic search processes (including FAISS) are configured and/or optimized to run on a single graphics processing unit (GPU) or central processing unit (CPU), which needs to have sufficient memory to hold an index representing the entire body of text being searched.

On the other hand, in many contexts, a body of data (e.g., enterprise data) may be too large (and/or result in an index that is too large) such that the GPU or CPU does not have sufficient memory to hold the entirety of the data (or index).

At the same time, enterprises (and/or enterprise management systems) have increasingly adopted distributed and/or parallel computing models, which provide the benefit of increased and more flexible scalability, among other examples. Often, the distributed and/or parallel computing models are implemented as services provided via distributed and/or parallel computing platforms. In one example, Apache Spark (of the Apache Software Foundation) is an open source analytics engine distributed over programmable clusters of processing and storage nodes. In another example, Dask is an open source parallel computing library enabling distributed storage of data and parallel computation in multi-core, local computing environments and/or distributed, cloud computing environments.

Examples of the present disclosure concern a distributed semantic search system that enables a semantic search process to be deployed in a distributed computing environment, allowing for high-performance and high-efficiency semantic search processes to be deployed and used with larger indexes than are currently possible in an individual processing unit, without sacrificing performance of the semantic search process. Additionally, such a distributed semantic search system provides low-overhead scalability, as it delegates semantic search functionality to data processing engines specifically designed to scale with particularly large data sets (e.g., "big data"). In some embodiments, such a distributed semantic search system may be configured to utilize one or more widely adopted and supported data formats (e.g., Parquet) that can be used across a wide variety of data processing engines without sacrificing generality.

FIG. 1 illustrates an exemplary block diagram of an environment 100 in which embodiments of the present disclosure may operate. Specifically, FIG. 1 illustrates one or more enterprise systems 110, a distributed semantic search system 140, an enterprise management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 store aggregated enterprise data, including (as defined and described above) enterprise data collected from and/or associated with the one or more enterprise systems 110 associated with the enterprise and/or enterprise data collected from one or more external data sources, main text data (e.g., comprising, included in, and/or derived from the aggregated enterprise data) representing a master corpus associated with the enterprise, enterprise management system 120, and/or distributed search system 140, one or more search indexes (e.g., generated from the main text data) for conducting semantic searches, one or more predefined partitioning schemas for the main text data, and/or any data resulting from semantic searches conducted with respect to the master corpus, among other examples.

The one or more user devices 160 may be associated with and/or operated by users of the enterprise management system 120, the distributed semantic search system 140, and/or any of the enterprise system(s) 110. In various embodiments, the enterprise management system 120 may cause data associated with the one or more enterprise systems 110 (e.g., aggregated enterprise data and/or any data derived from the aggregated enterprise data) to be transmitted to and/or displayed on the user device(s) 160. The distributed semantic search system 140 may cause data and/or interfaces associated with a semantic search process to be transmitted to and/or displayed on the user device(s) 160.

The one or more enterprise systems 110 may refer to enterprise systems of any type as defined and described above, such as operational systems and/or computer, software, and/or network systems, among other examples.

The distributed semantic search system 140 may be a computing system or device (e.g., server system) configured via hardware, software, firmware, and/or a combination thereof, to conduct semantic searches with respect to a master corpus (e.g., represented by and/or containing a main text data set derived from the aggregated enterprise data) via a plurality of semantic search nodes. More particularly, the distributed semantic search system 140 may be configured to partition a main text data set (e.g., representing the master corpus) into a plurality of node text data sets and to provision each of the plurality of semantic search nodes with a node index (e.g., corresponding to a portion of the main text data set and/or representing a portion of the master corpus) and a (e.g., local) instance of a semantic search process, each instance being configured to perform semantic search operations with respect to the corresponding node index based on a common query vector transmitted or broadcast to the semantic search nodes. Additionally, the distributed semantic search system 140 may be configured to, in conjunction with the user device(s) 160 and/or the enterprise management system 120, present and/or expose one or more semantic search request interfaces configured to receive input indicative of a search query. Based on such input, the distributed semantic search system 140 may be configured to generate the query vector used to conduct the semantic search. Moreover, the distributed semantic search system 140 may be configured to combine search results output by the individual instances of the semantic search process executing on the plurality of semantic search nodes into a master results set. The distributed semantic search system 140 may be configured to transmit the master results set to the enterprise management system 120, to cause the enterprise management system 120 to perform one or more enterprise management operations (e.g., with respect to the one or more enterprise systems 110) based at least in part on the master results set, and/or to present or display the results comprised by the master results set (e.g., via the enterprise management system 120 and/or the user devices 160).

In some embodiments, the distributed semantic search system 140 may be configured to generate node vector sets corresponding to each semantic search node based at least in part on the node text data set corresponding to the semantic search node. In one example, the distributed semantic search system 140 may be configured to generate the node vector set by text data from the node text data set using a trained language model. The distributed semantic search system 140 may be configured to generate the node index for each semantic search node based at least in part on the node vector set corresponding to the semantic search node. Moreover, in some embodiments, the distributed semantic search system 140 may be configured to train and/or tune (e.g., fine-tune) the trained language model used to embed the text data from the node text data set, for example, based on hyperparameters and sample query data comprising labeled semantic search inputs.

In some embodiments, the distributed semantic search system 140 may be configured to select (e.g., automatically) from a plurality of index structures associated with the semantic search process an optimal index structure, for example, based at least in part on hyperparameters associated with the plurality of index structures and to generate the node index for at least one of the semantic search nodes according to the selected optimal index structure.

The enterprise management system 120 may be or comprise an enterprise management system or EPM system as previously defined and described and/or may be or comprise a computing system or device (e.g., server system) configured via hardware, software, firmware, and/or a combination thereof, to perform various operations with respect to the enterprise system(s) 110, the aggregated enterprise data, and/or semantic searches conducted via the distributed semantic search system 140. For example, the enterprise management system 120 may be configured to (e.g., in conjunction with the user device(s) 160 and/or the semantic search request interface(s) generated and presented by the distributed semantic search system 140) receive and/or generate semantic search request input, and/or to present search results (e.g., derived from and/or comprising the master results set 344) generated by the distributed semantic search system 140. In another example, the enterprise management system 120 may be configured to perform one or more enterprise management operations (e.g., monitoring and control operations, insight generation and presentation operations) with respect to the enterprise system(s) 110 based at least in part on the master results sets generated by and received from the distributed semantic search system 140.

In some embodiments, the enterprise management system 120 may be configured to present and/or process any output data resulting from operations performed by the distributed semantic search system 140 and/or the enterprise system(s) 110, including, for example, presenting one or more monitoring, control, and/or insight interfaces within a graphical user interface (GUI) rendered on one or more displays of one or more of the user devices 160. The one or more interfaces may comprise one or more graphical elements for displaying the output data (e.g., including data resulting from processing the output data) and/or one or more interactable elements for receiving presentation and/or analysis input, for example, as user input. The presentation and/or analysis input may represent one or more selections of presentation parameters for determining how the output data is displayed and/or one or more selections of analysis parameters for determining how the output data is processed, to name a few examples. The output data presented and/or processed by the enterprise management system 120 may include the master results set and/or any data derived therefrom, for example.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more enterprise systems 110, a distributed semantic search system 140 (and/or any semantic search nodes thereof), an enterprise management system 120, data repositories 150, and/or user devices 160. The apparatus 200 includes processor 202, memory 204, input/output circuitry 206, communications circuitry 208, and/or distribution circuitry 210, semantic search circuitry 212, consolidation circuitry 214, aggregation circuitry 216, and/or request circuitry 216. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems 110, a distributed semantic search system 140 (and/or any semantic search nodes thereof), an enterprise management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Distribution circuitry 210 may be included in the apparatus 200 (e.g., an apparatus specifically corresponding to the distributed semantic search system 140). The distribution circuitry 210 may include hardware, software, firmware, and/or a combination thereof, designed and/or configured to request, receive, process, generate, and transmit data, data structures, control signals, and electronic information for provisioning semantic search nodes to perform the distributed semantic search functionality described herein, including performing any of the operations described herein with respect to partitioning a main text data set, generating node vector sets and/or node indexes, and/or provisioning semantic search nodes with corresponding node indexes and corresponding (e.g., local) instances of the semantic search process.

Semantic search circuitry 212 may be included in the apparatus 200 (e.g., an apparatus specifically corresponding to the distributed semantic search system 140 and/or any semantic search nodes thereof). The semantic search circuitry 212 may include hardware, software, firmware, and/or a combination thereof, designed and/or configured to request, receive, process, generate, and transmit data, data structures, control signals, and electronic information for conducting semantic searches, including performing any of the operations described herein with respect to executing the semantic search process at each semantic search node and/or possibly generating node indexes for each semantic search node.

Consolidation circuitry 214 may be included in the apparatus 200 (e.g., an apparatus specifically corresponding to the distributed semantic search system 140). The distribution circuitry 210 may include hardware, software, firmware, and/or a combination thereof, designed and/or configured to request, receive, process, generate, and transmit data, data structures, control signals, and electronic information for combining semantic search results output by the plurality of semantic search nodes, including performing any of the operations described herein with respect to combining the node results set, generating and/or transmitting the master results set, and/or causing execution of one or more operations based at least in part on the master results set.

Aggregation circuitry 216 may be included in the apparatus 200. The aggregation circuitry 216 may include hardware, software, firmware, and/or a combination thereof, designed and/or configured to aggregate, collect, retrieve, generate, capture, receive, request, and/or otherwise gather enterprise data from, associated with, and/or relevant to one or more enterprises and/or one or more enterprise systems 110. In some embodiments, the aggregation circuitry 216 includes hardware, software, firmware, and/or a combination thereof, that communicates with one or more controller(s), device(s), component(s), unit(s), and/or the like within a particular enterprise system to receive particular data associated with configuration and/or operations of the enterprise system. Additionally or alternatively, in some embodiments, the aggregation circuitry 216 includes hardware, software, firmware, and/or a combination thereof, configured to retrieve particular data (of the aggregated enterprise data) from external data sources from one or more data repository/repositories accessible to the apparatus 200, including publicly available databases, archives, and/or search indexes.

Request circuitry 218 may be included in the apparatus 200 (e.g., an apparatus specifically corresponding to the distributed semantic search system 140). The request circuitry 218 may include hardware, software, firmware, and/or a combination thereof, designed and/or configured to request, receive, process, generate, and transmit data, data structures, control signals, and electronic information for initiating semantic searches against the master corpus, including performing any of the operations described herein with respect to receiving semantic search request input and/or generating, transmitting, and/or broadcasting query vectors.

In some embodiments, two or more of the sets of circuitries 202-218 are combinable. Alternatively, or additionally, one or more of the sets of circuitry 202-218 perform some or all of the operations and/or functionality described herein as being associated with another circuitry. In some embodiments, two or more of the sets of circuitry 202-218 are combined into a single module embodied in hardware, software, firmware, and/or a combination thereof. For example, in some embodiments, one or more of the sets of circuitry, for example the distribution circuitry 210, may be combined with the processor 202, such that the processor 202 performs one or more of the operations described herein with respect the distribution circuitry 210.

FIG. 3 is an illustration of an example distributed semantic search system 140, in accordance with at least some example embodiments of the present disclosure. Specifically, FIG. 3 includes schematic depictions of the example distributed semantic search system 140, including example internal processes and components of the distributed semantic search system 140, and/or schematic depictions of the one or more data repositories 150, the enterprise management system 120, and the enterprise system(s) 110 in communication with the distributed semantic search system 140, along with example data objects used by and/or produced by the depicted processes, components, and/or systems. The distributed semantic search system 140 and/or apparatuses 200 associated therewith, for example, may be specially configured via hardware, software, firmware, and/or a combination thereof, to perform the various data processing and interactions described with respect to FIG. 3 to conduct semantic searches with respect to a master corpus via a semantic search process distributed among a plurality of semantic search nodes.

In the illustrated example, the distributed semantic search system 140 comprises, in some examples, a partitioning process 312, an embedding process 316, one or more index generation processes 320, a semantic search request interface 334, a semantic search request process 332, a results consolidation process 342, and a plurality of semantic search nodes 326, each comprising a corresponding index cache 328, and a corresponding instance of a semantic search process 330. Additionally, the one or more data repositories 150 comprise, in some examples, a node index store 324 and a master corpus 306.

As previously mentioned, an enterprise with which the distributed semantic search system 140 and/or enterprise management system 120 is associated may generate, collect, and/or accumulate a body of enterprise data that may contain data from, associated with, and/or relevant to any or all of the enterprise system(s) 110 and/or any processes and/or operations associated with the enterprise. In one example, the enterprise management system 120 may be configured to aggregate, collect, retrieve, generate, capture, receive, request, and/or otherwise gather such enterprise data from, associated with, and/or relevant to the enterprise and/or the enterprise systems 110, including any internally generated data, system data 302, and/or external data 303, and to combine such enterprise data to generate aggregated enterprise data 304.

In some embodiments, the aggregated enterprise data 304 may comprise system data 302 from and/or associated with the enterprise system(s) 110 and/or any data derived from the system data 302. For example, the system data 302 may include any data generated (e.g., by the respective enterprise system(s) 110, by the enterprise management system 120) in connection with configuration, operation, and/or maintenance of the various enterprise system(s) 110. More particularly, in some examples, the system data 302 may comprise data associated with one or more operational systems of the enterprise system(s) 110, including operational data (e.g., sensor data, operating conditions data, service data) and/or operational system context data (e.g., defining various attributes associated with physical or virtual objects of the operational system(s), including identifiers, relationships, types, locations, roles, descriptions, service notes, technical documentation, etc.). Additionally or alternatively, in some examples, the system data 302 may comprise data associated with any computer, software, and/or network systems of the enterprise system(s) 110, including any data identifying, defining, characterizing, and/or associated with one or more physical or virtual objects pertaining to the computer, software, and/or network systems, any data generated by, generated within, generated in connection with, and/or received by such objects pertaining to the computer, software, and/or network systems, these objects possibly including equipment, devices, processes, operations, communications, knowledge, products, services, users, employees, customers, markets, campaigns, and/or performance associated with any or all of the various systems and internal or external processes and/or operations implemented, managed, and/or facilitated by said systems.

In some embodiments, the aggregated enterprise data 304 may comprise external data 303 accessed, retrieved, collected, and/or received from one or more external sources of data, the external data 303 being associated with, related to, and/or useful for management of the various enterprise system(s) 110 and/or performance or management of the various internal or external processes and/or operations of the enterprise with which the enterprise management system 120 is associated. The external data 303 may comprise data from public archives, databases, research indexes, text data collections or corpuses, to list a few examples.

In some embodiments, the enterprise management system 120 may be configured to generate the aggregated enterprise data 304 by combining (and possibly integrating and/or cross-referencing) the system data 302, the external data 303, any data derived from the system data 302 and/or external data 303, and/or any data generated internally (e.g., by the enterprise management system 120).

In various embodiments, the aggregated enterprise data 304, comprising the system data 302, the external data 303, any data derived from the system data 302 and/or external data 303, and/or any internally-generated data may be stored in the one or more data repositories 150 (e.g., by the enterprise management system 120). More particularly, some or all of the aggregated enterprise data 304, including a main text data set 308 comprising any or all text data contained therein, may be stored in the one or more data repositories 150 as a master corpus 306. In one example, the master corpus 306 and/or the main text data set 308 of the master corpus 306 for a given enterprise may be a document and/or text archive comprising a body of text data relevant to operations and/or objectives of the enterprise and/or any enterprise system(s) 110 associated with the enterprise, the body of text data comprising, for example, any or all of the text data contained in the aggregated enterprise data 304. Additionally or alternatively, the master corpus 306 and/or the main text data set 308 of the master corpus 306 may comprise a body of text data including any natural language specimens (e.g., data objects comprising natural language) derived or extracted from the aggregated enterprise data 304.

Additionally or alternatively, and for the purposes of illustration, in some examples the master corpus 306 and/or the main text data set 308 of the master corpus 306 may comprise some or all of the operational data and/or operational system context data (as defined and described above), technical documentation and/or manuals (e.g., associated with configuration and/or functioning of various equipment and/or assets of the enterprise system(s) 110), documentation and/or manuals associated with internal processes or operations of the enterprise, internal or external communications and/or correspondence between various entities within and/or outside of the enterprise, contracts or legal agreements between various entities within and/or outside of the enterprise, any documents or records associated with legal and/or regulatory proceedings associated with the enterprise, any documents or records associated with intellectual property protection proceedings associated with the enterprise, any web content input, generated, published, and/or distributed via one or more of the enterprise system(s) 110, user-generated content generated within and/or via one or more of the enterprise system(s) 110, any files, documents, or records of the enterprise and/or enterprise system(s) 110, any internally-produced and/or hosted and/or external, publicly-available pages of collaboratively produced content (e.g., wikis), copies of published written works such as books, magazines, journals, and/or articles, and/or web content including articles, blog posts, social media posts, forum posts, reviews, and/or web pages, among other examples.

The distributed semantic search system 140 may be configured to conduct semantic search operations with respect to the master corpus 306 via a semantic search process distributed among the plurality of semantic search nodes 326 of the distributed semantic search system 140. In some embodiments, the distributed semantic search system 140 may be configured to provision the plurality of semantic search nodes 326 of the distributed semantic search system 140 to perform, collectively across all of the plurality of semantic search nodes 326 in a distributed and/or parallel manner, the semantic search operations with respect to the master corpus 306.

In some embodiments, the distributed semantic search system 140 may be configured to provision each individual semantic search node 326 of the plurality of semantic search nodes 326 with a corresponding node index 322 representing and/or corresponding to a particular portion of the master corpus 306.

More particularly, the partitioning process 312 of the distributed semantic search system 140 may be configured to retrieve and/or receive the main text data set 308 representing the master corpus 306 from the one or more data repositories 150 and/or to partition the main text data set 308 into a plurality of node text data sets 314 based at least in part on a (e.g., predefined, user-configurable) partitioning schema 310. Each of the node text data sets 314 may represent a portion of the master corpus 306 and may comprise a subset of text data (and/or associated metadata) from the main text data set 308, the subset of text data corresponding to the portion of the master corpus 306 represented by the node text data set 314.

The partitioning schema 310 may comprise one or more items of configuration data defining various parameters to be used by the partitioning process 312 to partition the main text data set 308 into the plurality of node text data sets 314. In one example, the partitioning schema 310 may comprise a definition of a quantity of partitions to generate (and/or data or instructions for determining same) and/or a delineation and/or definition of which portion of the main text data set 308 will be comprised by and/or correspond to which node text data set 314 (and/or data or instructions for determining same). Additionally or alternatively, the partitioning schema 310 may be configured such that the portion of the master corpus 306 and/or main text data set 308 represented by each node text data set 314 is determined based at least in part on time data, region data, and/or categories associated with each discrete object (e.g., document, discrete item of text data) included in the master corpus 306 and/or main text data set 308.

In one example, the partitioning schema 310 may define data and/or instructions that cause the partitioning process 312 to partition the main text data set 308 into the plurality of node text data sets 314 by dividing documents in the main text data set 308 into a plurality of groups (e.g., according to dates and/or times associated with each document) and generating each node text data set 314 to comprise the text data from all of the documents in a corresponding one of the plurality of groups. The partitioning schema 310 may comprise data and/or instructions for determining a quantity of groups and/or assigning the various documents to the different groups. For example, the partitioning schema 310 may define each of the groups and/or which documents are assigned to each group. In another example, the partitioning schema 310 may define a maximum size for a node text data set 314 (and/or any vector sets or indexes derived therefrom) and a selected attribute to use to divide up the documents (e.g., time, region, categories, attributes of the documents), and the partitioning process 312 may be configured to determine a quantity of groups or partitions based at least in part on the maximum size (e.g., based on a size of the main text data set 308) and to assign the documents to each group based at least in part on the selected attribute (e.g., determining a full range of times assigned to all of the documents in the main text data set 308, assigning to each group a sub-range of times within the full range of times, and generating each node text data set 314 to comprise the text data from all documents falling within the sub-range of times assigned to a corresponding group).

In one example, each of the node text data sets 314 may correspond uniquely to one of the semantic search nodes 326. Accordingly, in some embodiments, the distributed semantic search system 140 may be configured to provision a particular quantity of the plurality of semantic search nodes 326, which quantity may correspond to the quantity of node text data sets 314 into which the main text data set 308 is partitioned by the partitioning process 312. Moreover, after an initial partitioning of the main text data set 308 into a quantity of the plurality of node text data sets 314 and provisioning of a corresponding quantity of semantic search nodes 326, the partitioning process 312 may be configured to subsequently generate additional, new node text data sets 314, and the distributed semantic search system 140 may be configured to provision an additional, new semantic search node 326, corresponding to each new node text data set 314, to be added to the plurality of search nodes 326. In some embodiments, a quantity of semantic search nodes 326 in the plurality of semantic search nodes 326 may be predetermined (and/or user-configured), and the partitioning process 312 may be configured to partition the main text data set 308 into the predetermined quantity of node text data sets 314, with each of the node text data sets 314 uniquely corresponding to one of the plurality of semantic search nodes 326.

In various embodiments, the distributed semantic search system 140 may be configured to generate, for each semantic search node 326 of the plurality of semantic search nodes 326 a corresponding node index 322 based at least in part on the node text data set 314 corresponding to the semantic search node 326. More particularly, the embedding process 316 of the distributed semantic search system 140 may be configured to generate a plurality of node vector sets 318, each corresponding to a node text data set 314 (and/or to the semantic search node 326 associated with the node text data set 314) based at least in part on the corresponding node text data set 314. The index generation process(es) 320 may be configured to generate a plurality of node indexes 322, each corresponding to a node vector set 318 (and/or to the semantic search node 326 associated with the node vector set 318) based at least in part on the corresponding node vector set 318.

In some embodiments, the embedding process 316 may be configured to generate a particular node vector set 318 by embedding text from a particular node text data set 314 corresponding to the particular node vector set 318 to produce the particular node vector set 318. More particularly, the embedding process 316 may be configured to generate the node vector set 318 based at least in part on underlying meanings associated with various items of the text data (e.g., meanings of words, sentences, paragraphs, and/or documents), for example, by defining and/or expressing (in each node vector set 318) the meanings of each item of text data in the corresponding node text data set 314 as series of one or more numerical values (e.g., real numbers) to produce one or more vectors or feature vectors representing the various items of text data such that a distance between given items of text data (as represented in their numerical form in the vectors) in a vector space associated with the vector corresponds to semantic similarity (e.g., similarity in meaning) between the given items of text data. In some embodiments, the embedding process 316 may be configured to generate the node vector set 318 using one or more natural language processing methods, including, in one example, using a trained language model configured to receive a text data set as input and output a vector set representing the received text data set.

In some embodiments, the one or more index generation processes 320 may comprise a central index generation process (e.g., executed centrally by the distributed semantic search system 140) configured to generate the plurality of node indexes 322, which may then be distributed among the plurality of semantic search nodes 326. In some embodiments, the one or more index generation processes 320 may comprise a plurality of distributed index generation processes (e.g., each executed by a semantic search nodes 326), which may be configured to receive a particular node vector set 318 and to generate the node index 322 based on the particular node vector set 322. Each of the one or more index generation processes 320 may be configured to generate a particular node index 322 based at least in part on a particular node vector set 318 corresponding to the particular node index 322, for example, by processing the particular node vector set 318, including transforming the data contained in the particular node vector set 318 such that it is structured optimally for (e.g., sufficient) semantic search operations. In some embodiments, the semantic search process that is distributed among the plurality of semantic search nodes 326 may comprise and/or utilize a semantic search library (e.g., FAISS), which may include one or more callable functions for generating an index suitable for semantic search operations performed using the semantic search library. In some embodiments, each of the plurality of node indexes 322 may comprise data expressed as binary values organized in arrays of bytes.

In some embodiments, the index generation process(es) 320 may be configured to store the plurality of node indexes 322 in the node index store 324, which may be stored in the one or more data repositories 150. The node index store 324 may be configured to store the plurality of node indexes 322 as a file configured and/or structured according to a columnar file format (e.g., as a Parquet file). In one example, the index generation process(es) 320 may be configured to add each node index 322 to a table defined according to the Parquet file format as a corresponding column of binary values.

Additionally or alternatively, the index generation process(es) 320 may be configured to provision each individual semantic search node 326 of the plurality of semantic search nodes 326 with the node index 322 corresponding to the semantic search node 326 by loading the node index 322 into the index cache 328 of the semantic search node 326 for fast and/or efficient access by the corresponding semantic search process 330. Additionally or alternatively, each semantic search node 326 may be configured to load the corresponding node index 322 into its corresponding node index cache 328 by accessing and/or retrieving the node index cache 322 from the node index store 324 (e.g., as a Parquet file stored in a shared memory system of the semantic search nodes 326 or stored in memory otherwise accessible to the semantic search nodes 326). The index generation process(es) 320 and/or the semantic search nodes 326 may be configured such that loading of the node index 322 into a corresponding index cache 328 may be performed such that the node index 322 persists in the corresponding index cache 328 independently with respect to distinct executions of the corresponding instance of the semantic search process 330 and/or distinct semantic search operations performed at the corresponding semantic search node 326. Accordingly, the generation of a node index 322 and/or loading of the node index 322 into a corresponding index cache 328, which may be a particularly time consuming process relative to semantic search operations subsequently performed with respect to the node index 322, may be a one-time operation or otherwise an operation performed sparingly relative to a frequency or number of iterations of the semantic search operations that are performed with respect to the node index 322. In this way, for example, the distributed semantic search system 140 is configured to perform the distributed semantic search functionality described herein with optimal efficiency and speed, as the node index 322, once generated and loaded into the index cache 328, may be used as many times as needed in connection with as many semantic search operations as needed without having to re-generate and/or re-load the index.

In some embodiments, each of the plurality of semantic search nodes 326 may be embodied in and/or comprise a computing entity (e.g., an apparatus 200) with at least a processor or processing device or unit (e.g., processor circuitry 202) and memory (e.g., memory 204), the processor or processing device or unit being configured to execute instructions stored in the memory independently with respect to the other semantic search nodes 326 and/or based on instructions and/or input received from one or more processes of the distributed semantic search system 140. The plurality of semantic search nodes 326 may be implemented via and/or configured according to one or more distributed, parallel, and/or cloud computing platforms or engines such as Spark or Dask as described above.

In some embodiments, the distributed semantic search system 140 may be configured to provision each individual semantic search node 326 of the plurality of semantic search nodes 326 with a corresponding (e.g., locally executing) instance of the semantic search process 330 that is distributed across the plurality of semantic search nodes 326. In some embodiments, the semantic search process that is distributed among the plurality of semantic search nodes 326 may be embodied in and/or comprise the FAISS library as previously described, and the distributed semantic search system 140 may be configured to provision each individual semantic search node 326 with code and/or instructions from a semantic search library (e.g., FAISS) associated with the semantic search process being distributed across the plurality of semantic search nodes 326. Additionally or alternatively, the semantic search process that is distributed among the plurality of semantic search nodes 326 may comprise programmable instructions configured to cause a processing entity (e.g., individual semantic search node 326) executing the semantic search process to perform a semantic search with respect to a particular text data set specific to the processing entity (e.g., the node text data set 314 corresponding to the individual semantic search node 326), which particular text data set may be represented (e.g., indexed) locally in memory of the processing entity (e.g., represented by the node index 322 stored in the index cache 328 of the semantic search node 326) and/or accessible by the processing entity (e.g., in a shared memory system).

In various embodiments, the distributed semantic search system 140 may be configured to perform and/or facilitate distributed semantic search operations with respect to the master corpus 306. For example, the distributed semantic search system 140 may be configured to receive a query vector 338 representing input for a semantic search to be performed over the master corpus 306 and/or to transmit or broadcast the query vector 338 to each of the plurality of semantic search nodes 326. The instance of the semantic search process 330 corresponding to each semantic search node 326 (e.g., executed by the corresponding semantic search node 326) may be configured to perform a semantic search operation (defined by the semantic search process distributed among the plurality of semantic search nodes 326) based at least in part on the query vector and on the node index 322 specifically corresponding to the semantic search node 326 (e.g., the node index 322 stored in the index cache 328 of the corresponding semantic search node 326). More particularly, each semantic search node 326 may be configured to generate a node results set 340 representing output of a semantic search over a portion of the master corpus 306 represented by the node text data set 314 (and/or node index 322) corresponding to the semantic search node 326, for example, by executing the corresponding (e.g., local) instance of the semantic search process 330 based at least in part on the query vector 338 and on the corresponding node index 322.

In some embodiments, the distributed semantic search system 140 may be configured to receive and/or generate the query vector 338 via the semantic search request interface 334. More particularly, in some embodiments, the semantic search request process 332 of the distributed semantic search process 140 may be configured to present and/or expose the semantic search request interface 334, which may be configured to receive the semantic search request input 336 (e.g., from and/or based on input received and/or detected by the enterprise management system 120 and/or user device(s) 160). In one example, the semantic search request process 332 may be configured to present the semantic search request interface 334 within a graphical user interface (GUI) rendered on one or more displays of one or more of the user devices 160, the semantic search request interface 334 comprising one or more interactable elements configured to receive input or selections (of the semantic search request input 336) indicative of various characteristics, aspects, properties, and/or parameters associated with a requested semantic search operation. Additionally or alternatively, the semantic search request process 332 may be configured to present the semantic search request interface 334 by exposing an application programming interface (API) configured to receive the semantic search request input 336 (e.g., from the enterprise management system 120 and/or any processes or components thereof, from the user device(s) 160).

In various embodiments, the semantic search request input 336 may comprise text data representing text to be searched for within the master corpus 306 via the semantic search process, and semantic search request process 332 may be configured to generate the query vector 338 based at least in part on the text data included in the semantic search request input 336 (e.g., by performing the same or similar embedding functionality attributed to the embedding process 316 or otherwise translating the text data into a vectorized or numerical form as described with respect to the embedding process 316).

In various embodiments, the results consolidation process 342 of the distributed semantic search process 140 may be configured to generate a master results set 344 based at least in part on the plurality of node results sets 340 generated by and/or received from each of the plurality of semantic search nodes 326. More particularly, the results consolidation process 342 may be configured to generate the master results set 344 by combining the plurality of node results sets 340 (comprising the individual node results sets 340 generated at each individual semantic search node 326).

In some embodiments, each of the node results sets 340 may represent output of a semantic search (e.g., for the text data represented by the query vector 338) over the portion of the master corpus 306 (and/or node text data set 314) corresponding to the semantic search node 326 that generated the node results set 340. Each of the node results sets 340 may comprise a predetermined quantity (e.g., at least one) of matches, each match comprising, for example, a portion of text data (specifically from the node text data set 314 corresponding to the semantic search node 326) determined to have a similar meaning as the text data represented by the query vector 338 and/or an indication of one or more discrete items of text data (e.g., document, page, paragraph) that contains the portion of text data with the similar meaning.

Similarly, in some embodiments, the master results set 344 may represent output of a semantic search (e.g., for the text data represented by the query vector 338) over the master corpus 306 and/or may comprise a predetermined quantity (e.g., at least one) of matches, each match comprising, for example, a portion of text data determined to have a similar meaning as the text data represented by the query vector 338 and/or an indication of one or more discrete items of text data (e.g., document, page, paragraph) that contains the portion of text data with the similar meaning.

Additionally or alternatively, each node results set 340 of the plurality of node results sets 340 may comprise a top-k set of ranked results or matches determined by the instance of the semantic search process 330 corresponding to the semantic search node 326 at which the node results set 340 is generated, and combining the plurality of node results sets 340 to generate the master results set 344 may comprise determining a top-k set of the ranked results from all of the different node results sets 340 and including the top-k set of the ranked results from all of the different node results sets 340 in the master results set 344.

In various embodiments, the results consolidation process 342 may be configured to transmit the master results set 344 to the enterprise management system 120, present the data comprised by the master results set 344 (e.g., some or all of the matches found across all of the different semantic search nodes 326) via the enterprise management system 120 and/or the user device(s) 160, and/or cause the enterprise management system 120 to perform one or more enterprise management operations 346 with respect to the enterprise system(s) 110 based at least in part on the master results set 344 and/or in response to receiving the master results set 344. For example, the enterprise management system 120 may comprise one or more automation processes or components for automatically controlling configuration of and/or behavior of assets and/or equipment of the enterprise system(s) 110, which processes and/or components may be configured to control the configuration of and/or behavior of the assets and/or equipment based at least in part on the master results set 344. In another example, the enterprise management system 120 may comprise one or more analytics processes or components for analyzing data (e.g., the aggregated enterprise data 304) and determining and/or presenting insights concerning performance of the various enterprise system(s) 110 and/or related processes or operations, which processes and/or components may be configured to determine and/or present the insights based at least in part on the master results set 344 and/or to include data derived from the master results set 344.

It should be appreciated that the distributed semantic search system 140 may partition the main text data set 308 into any suitable quantity of node text data sets 314 and/or may comprise any suitable quantity of semantic search nodes 326. In the illustrated example, the plurality of semantic search nodes 326 is depicted as comprising a set ranging from a first semantic search node 326*a* and a second semantic search node 326*b* to an nth semantic search node 326*n*. For the sake of clarity, the index cache 328 and the corresponding instance of the semantic search process 330 are depicted only with respect to the nth semantic search node 326, but it should be appreciated that a corresponding set of such components would be comprised by each of the plurality of semantic search nodes 326.

Moreover, in the illustrated example, the partitioning process 312 generates a first node text data set 314*a* (of the plurality of node text data sets 314) corresponding to the first semantic search node 326*a*. The embedding process 316 generates a first node vector set 318*a* (of the plurality of node vector sets 318) corresponding to the first semantic search node 326*a* and based at least in part on the first node text data set 314*a*. The index generation process(es) 320 generates a first node index 322*a* (of the plurality of node indexes 322) corresponding to the first semantic search node 326*a* based at least in part on the first node vector set 318*a* and provisions the first semantic search node 326*a* with the first node index 322*a* (e.g., loads the first node index 322*a* into an index cache of the first semantic search node 326*a*).

Similarly, in the illustrated example, the partitioning process 312 generates a second node text data set 314*b* (of the plurality of node text data sets 314) corresponding to the second semantic search node 326*b*. The embedding process 316 generates a second node vector set 318*b* (of the plurality of node vector sets 318) corresponding to the second semantic search node 326*b* and based at least in part on the second node text data set 314*b*. The index generation process(es) 320 generates a second node index 322*b* (of the plurality of node indexes 322) corresponding to the second semantic search node 326*b* and based at least in part on the second node vector set 318*b* and provisions the second semantic search node 326*b* with the second node index 322*b* (e.g., loads the second node index 322*b* into an index cache of the second semantic search node 326*b*).

Similarly, in the illustrated example, the partitioning process 312 generates an nth node text data set 314*n* (of the plurality of node text data sets 314) corresponding to the nth semantic search node 326*n*. The embedding process 316 generates an nth node vector set 318*n* (of the plurality of node vector sets 318) corresponding to the nth semantic search node 326*n* and based at least in part on the nth node text data set 314*n*. The index generation process(es) 320 generates an nth node index 322*n* (of the plurality of node indexes 322) corresponding to the nth semantic search node 326*n* and based at least in part on the nth node vector set 318*n* and provisions the nth semantic search node 326*n* with the nth node index 322*n* (e.g., loads the nth node index 322*n* into an index cache of the nth semantic search node 326*n*).

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 4-7 illustrate flowcharts including operational blocks of example processes in accordance with at least some example embodiments of the present disclosure. In some embodiments, the computer-implemented processes of FIGS. 4-7 are each embodied by computer program code stored on a non-transitory computer-readable medium of a computer program product configured for execution to perform the computer-implemented method. Alternatively or additionally, in some embodiments, the example processes of FIGS. 4-7 are performed by one or more specially configured computing devices, such as the specially configured apparatus 200 (e.g., via distribution circuitry 210, semantic search circuitry 212, consolidation circuitry 214, aggregation circuitry 216, and/or request circuitry 218). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 4-7. In some embodiments, the specially configured apparatus 200 includes and/or otherwise is in communication with one or more external apparatuses, systems, devices, and/or the like, to perform one or more of the operations as depicted and described. While the operational blocks of each of the example processes are depicted in each of FIGS. 4-7 in a particular order, this should not be understood as requiring that such operations be performed in the particular order shown or in sequential order, or that all illustrated operations be performed.

FIG. 4 illustrates a flowchart including operational blocks of an example process 400 for performing a distributed semantic search with respect to a master corpus, in accordance with at least some example embodiments of the present disclosure.

The process 400 begins at operation 402, at which an apparatus (such as, but not limited to, the apparatus 200 or circuitry thereof as described above in connection with FIG. 2) partitions a main text data set representing a master corpus into a plurality of node text data sets each representing a portion of the master corpus based at least in part on a predefined partitioning schema. Each node text data set of the plurality of node text data sets generated at operation 402 may correspond uniquely to a semantic search node of a plurality of semantic search nodes. In various embodiments, the main text data set partitioned at operation 402 may correspond to and/or comprise the main text data set 308 as defined and described with respect to FIG. 3, the master corpus represented by the main text data set partitioned at operation 402 may correspond to and/or comprise the master corpus 306 as defined and described with respect to FIG. 3, the predefined partitioning schema referenced with respect to operation 402 may correspond to and/or comprise the partitioning schema 310 as defined and described with respect to FIG. 3, the plurality of node text data sets generated at operation 402 may correspond to and/or comprise the plurality of node text data sets 314 as defined and described with respect to FIG. 3, and partitioning the main text data set at operation 402 may comprise some or all of the analogous functionality attributed to the partitioning process 312 as described with respect to FIG. 3. Moreover, the plurality of semantic search nodes referenced with respect to operation 402 may correspond to and/or comprise the plurality of semantic search nodes 326 as defined and described with respect to FIG. 3.

At operations 404 and 406 of the process 400, an apparatus (such as, but not limited to, the apparatus 200 or circuitry thereof described above in connection with FIG. 2), for each semantic search node of the plurality of semantic search nodes referenced with respect to operation 402, generates a corresponding node index based at least in part on the node text data set corresponding to the semantic search node.

More particularly, at operation 404 of the process 400, an apparatus (such as, but not limited to, the apparatus 200 or circuitry thereof described above in connection with FIG. 2), for each semantic search node of the plurality of semantic search nodes referenced with respect to operation 402, generates a corresponding node vector set based at least in part on the node text data set corresponding to the semantic search node. Generating each of the node vector sets at operation 404 may comprise embedding text from the node text data set corresponding to the node vector set using, for example, a trained language model. In various embodiments, the node vector sets generated at operation 404 may correspond to and/or comprise the node vector sets 318 as defined and described with respect to FIG. 3, and generating the node vector sets 318 at operation 404 may comprise some or all of the analogous functionality attributed to the embedding process 316 as described with respect to FIG. 3.

At operation 406 of the process 400, an apparatus (such as, but not limited to, the apparatus 200 or circuitry thereof described above in connection with FIG. 2), for each semantic search node of the plurality of semantic search nodes referenced with respect to operation 402, generates a corresponding node index based at least in part on the corresponding node vector set generated at operation 404. In various embodiments, the node indexes generated at operation 406 may correspond to and/or comprise the node indexes 322 as defined and described with respect to FIG. 3, and generating the node indexes at operation 406 may comprise some or all of the analogous functionality attributed to the index generation process(es) 320 as described with respect to FIG. 3.

At operation 408 of the process 400, an apparatus (such as, but not limited to, the apparatus 200 or circuitry thereof described above in connection with FIG. 2) stores the plurality of node indexes generated at operation 406 in a node index store. In some embodiments, the node index store in which the node indexes are stored at operation 408 may be configured to store the plurality of node indexes in a file according to a columnar file format (e.g., Parquet). Moreover, in various embodiments, the node index store in which the node indexes are stored at operation 408 may correspond to and/or comprise the node index store 324 as defined and described with respect to FIG. 3, and storing the node indexes in the node index store at operation 408 may comprise some or all of the analogous functionality attributed to the index generation process(es) 320 as described with respect to FIG. 3.

At operation 410 of the process 400, for each semantic search node of the plurality of semantic search nodes referenced with respect to the preceding operations, an apparatus (such as, but not limited to, the apparatus 200 or circuitry thereof described above in connection with FIG. 2) loads the corresponding node index generated at operation 406 and/or stored at operation 408 into a node index cache of the semantic search node. The node index may be loaded into a persistent node index cache at operation 410 and/or the node index may be loaded in a persistent manner into the node index cache (e.g., such that the node index persists in the index cache independently with respect to distinct and/or repeated executions of a corresponding instance of a semantic search process and/or distinct semantic search operations performed at the corresponding semantic search node). In various embodiments, the node index cache into which the node index is loaded at operation 410 may correspond to and/or comprise the index cache 328 as defined and described with respect to FIG. 3, and loading the node index into the index cache at operation 410 may comprise some or all of the analogous functionality attributed to the index generation process(es) 320 and/or the semantic search nodes 326 as described with respect to FIG. 3.

At operation 412 of the process 400, an apparatus (such as, but not limited to, the apparatus 200 or circuitry thereof described above in connection with FIG. 2) receives a query vector representing input for a semantic search to be performed over the master corpus referenced with respect to operation 402. In various embodiments, the query vector received at operation 412 may correspond to and/or comprise the query vector 338 as defined and described with respect to FIG. 3, and receiving the query vector at operation 412 may comprise some or all of the analogous functionality attributed to the semantic search request process 332 as described with respect to FIG. 3.

At operation 414 of the process 400, at each semantic search node of the plurality of semantic search nodes referenced with respect to the preceding operations, an apparatus (such as, but not limited to, the apparatus 200 or circuitry thereof described above in connection with FIG. 2) generates a node results set representing output of a semantic search over the portion of the master corpus represented by the node text data set corresponding to the semantic search node. Generating the node results set at operation 414 may comprise executing (e.g., by each semantic search node) a corresponding instance of a semantic search process based at least in part on the query vector received at operation 412 and on the node index corresponding to the semantic search node (namely the node index generated, stored, and loaded into the node index cache with respect to the corresponding semantic search node at, respectively, operations 406, 408, and 410). In various embodiments, the node results sets generated at operation 414 may correspond to and/or comprise the node results sets 340 as defined and described with respect to FIG. 3, and generating the node results sets at operation 414 may comprise some or all of the analogous functionality attributed to the plurality of semantic search nodes 326 (and/or to the respective instances of the semantic search process executing on each of the plurality of semantic search nodes 326) as described with respect to FIG. 3. Moreover, the corresponding instances of the semantic search process executed at operation 414 may correspond to and/or comprise the example instance of the semantic search process 330 as defined and described with respect to FIG. 3.

At operation 416 of the process 400, an apparatus (such as, but not limited to, the apparatus 200 or circuitry thereof described above in connection with FIG. 2) generates a master results set representing output of a semantic search over the master corpus (referenced with respect to operation 402). The master results set may be generated at operation 416, for example, by combining the plurality of node results sets generated at operation 414. In various embodiments, the master results set generated at operation 416 may correspond to and/or comprise the master results set 344 as defined and described with respect to FIG. 3, and generating the master results set at operation 416 may comprise some or all of the analogous functionality attributed to the results consolidation process 342 as described with respect to FIG. 3.

FIG. 5 illustrates a flowchart including operational blocks of an example process 500 for performing a distributed semantic search specifically in an enterprise management context, in accordance with at least some example embodiments of the present disclosure.

The process 500 begins at operation 502, at which an apparatus (such as, but not limited to, the apparatus 200 or circuitry thereof as described above in connection with FIG. 2) receives and/or generates aggregated enterprise data and stores the aggregated enterprise data at least partially as a main text data set representing a master corpus. The aggregated enterprise data may be received and/or generated at operation 502 via an enterprise management system 120, in one example. In various embodiments, the aggregated enterprise data received and/or generated at operation 502 may correspond to and/or comprise the aggregated enterprise data 304 as defined and described with respect to FIG. 3, and receiving and/or generating the aggregated enterprise data at operation 502 may comprise some or all of the analogous functionality (e.g., attributed to the enterprise management system 120) as described with respect to FIG. 3. Moreover, the main text data set and/or the master corpus referenced with respect to operation 502 may correspond to and/or comprise, respectively, the main text data set and/or the master corpus referenced with respect to operation 402 of the process 400 as described with respect to FIG. 4.

At operation 504 of the process 500, an apparatus (such as, but not limited to, the apparatus 200 or circuitry thereof described above in connection with FIG. 2) partitions the main text data set referenced with respect to operation 502 into node text data sets (e.g., each corresponding to a semantic search node of a plurality of semantic search nodes), generates node indexes for each of the plurality of semantic search nodes, and provisions each of the semantic search nodes with the node index corresponding to the semantic search node and with a corresponding instance of a semantic search process. In various embodiments, partitioning the main text data set at operation 504 may correspond to, comprise, and/or be comprised by the functionality defined for operation 402 of the process 400 as described with respect to FIG. 4. Accordingly, the node text data sets into which the main text data set is partitioned at operation 504 may correspond to and/or comprise the node text data sets generated at operation 402 of the process 400 as described with respect to FIG. 4. Similarly, the plurality of semantic search nodes, the node indexes, and/or the instances of the semantic search process referenced with respect to operation 504 may correspond to, comprise, and/or be comprised by, respectively, the plurality of semantic search nodes, the node indexes, and/or the instances of the semantic search process referenced with respect to the various operations of the process 400 as described with respect to FIG. 4.

At operation 506 of the process 500, an apparatus (such as, but not limited to, the apparatus 200 or circuitry thereof described above in connection with FIG. 2) presents a semantic search request interface. In various embodiments, the semantic search request interface presented at operation 506 may correspond to and/or comprise the semantic search request interface 334 as defined and described with respect to FIG. 3, and presenting the semantic search request interface at operation 506 may comprise some or all of the analogous functionality attributed to the semantic search request process 332 as described with respect to FIG. 3. Moreover, presenting the semantic search request interface at operation 506 may be part of the functionality defined for operation 412 (for receiving a query vector) of the process 400 as described with respect to FIG. 4.

At operation 508 of the process 500, an apparatus (such as, but not limited to, the apparatus 200 or circuitry thereof described above in connection with FIG. 2) receives semantic search request input via the semantic search request interface presented at operation 506. In various embodiments, the semantic search request input received at operation 508 may correspond to and/or comprise the semantic search request input 336 as defined and described with respect to FIG. 3, and receiving the semantic search request input at operation 508 may comprise some or all of the analogous functionality attributed to the semantic search request process 332 as described with respect to FIG. 3. Moreover, receiving the semantic search request input at operation 508 may be part of the functionality defined for operation 412 (for receiving a query vector) of the process 400 as described with respect to FIG. 4.

At operation 510 of the process 500, an apparatus (such as, but not limited to, the apparatus 200 or circuitry thereof described above in connection with FIG. 2) generates a query vector based at least in part on the semantic search request input received at operation 508. In various embodiments, the query vector generated at operation 410 may correspond to, comprise, and/or be comprised by the query vector referenced with respect to operation 412 of the process 400 as described with respect to FIG. 4.

At operation 512 of the process 500, an apparatus (such as, but not limited to, the apparatus 200 or circuitry thereof described above in connection with FIG. 2) distributes and/or broadcasts the query vector generated at operation 510 to the plurality of semantic search nodes referenced with respect to operation 504, receives from each of the plurality of semantic search nodes a node results set output by the semantic search node, and generates a master results set based at least in part on the plurality of node results sets received from the plurality of semantic search nodes. In various embodiments, distributing and/or broadcasting the query vector to the plurality of semantic search nodes at operation 512 may comprise some or all of the analogous functionality attributed to the semantic search request process 332 as described with respect to FIG. 3. Moreover, the node results sets received at operation 512 may correspond to, comprise, and/or be comprised by the node results sets referenced with respect to operation 414 of the process 400 as described with respect to FIG. 4. Similarly, the master results set generated at operation 512 may correspond to, comprise, and/or be comprised by the master results set referenced with respect to operation 416 of the process 400 as described with respect to FIG. 4, and generating the master results set at operation 512 may correspond to, comprise, and/or be comprised by some or all of the analogous functionality attributed to operation 416 of the process 400 as defined and described with respect to FIG. 4.

At operation 514 of the process 500, an apparatus (such as, but not limited to, the apparatus 200 or circuitry thereof described above in connection with FIG. 2) transmits the master results set generated at operation 512 to the enterprise management system 120 referenced with respect to operation 502 and/or causes the enterprise management system 120 to perform one or more enterprise management operations (e.g., with respect to the enterprise system(s) 110 managed via the enterprise management system 120) based at least in part on the master results set. In some embodiments, the enterprise management operation(s) caused at operation 514 may correspond to and/or comprise the enterprise management operation(s) 346 as defined and described with respect to FIG. 3, and causing the enterprise management system 120 to perform the enterprise management operation(s) at operation 514 may comprise some or all of the analogous functionality attributed to the results consolidation process 342 as described with respect to FIG. 3.

FIG. 6 illustrates a flowchart including operational blocks of an example process 600 for tuning a language model to generate node vector sets, in accordance with at least some example embodiments of the present disclosure.

The process 600 begins at operation 602, at which an apparatus (such as, but not limited to, the apparatus 200 or circuitry thereof as described above in connection with FIG. 2) tunes a language model (e.g., configured to generate node vector sets) based at least in part on one or more hyperparameters and/or on sample query data. For example, in some embodiments, the apparatus may train and/or tune (e.g., fine-tune) the trained language model used to embed text data from node text data sets. Here, the node text data sets may correspond to the node text data sets 314 as defined and described with respect to FIG. 3, and embedding the text data from the node text data sets 314 may correspond to, comprise, and/or be comprised by some or all of the analogous functionality attributed to the embedding process 316 as described with respect to FIG. 3. Moreover, in some embodiments, the sample query data may comprise, for example, labeled semantic search inputs suitable for evaluating performance of the distributed semantic search process when differently tuned language models are used to embed text data in connection with the semantic search (e.g., to generate the query vector, to generate the node vector sets).

At operation 604 of the process 600, an apparatus (such as, but not limited to, the apparatus 200 or circuitry thereof described above in connection with FIG. 2) generates the node vector sets for each semantic search node of a plurality of semantic search nodes based at least in part on the tuned language model tuned at operation 602. In various embodiments, generating the node vector sets at operation 604 may correspond to, comprise, and/or be comprised by the analogous functionality performed at operation 404 of the process 400 as described with respect to FIG. 4.

FIG. 7 illustrates a flowchart including operational blocks of an example process 700 for selecting an optimal index structure for generating node indexes, in accordance with at least some example embodiments of the present disclosure.

The process 700 begins at operation 702, at which an apparatus (such as, but not limited to, the apparatus 200 or circuitry thereof as described above in connection with FIG. 2) selects (e.g., automatically), from a plurality of index structures associated with a semantic search process, an optimal index structure based at least in part on hyperparameters associated with each of the index structures in connection with using the various index structures in a distributed search process.

At operation 704 of the process 700, an apparatus (such as, but not limited to, the apparatus 200 or circuitry thereof described above in connection with FIG. 2) generates, according to the selected optimal index structure, node indexes each corresponding to a semantic search node across which the semantic search process is distributed. In various embodiments, generating the node indexes at operation 704 may correspond to, comprise, and/or be comprised by the analogous functionality performed at operation 406 of the process 400 as described with respect to FIG. 4.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:

partition a main text data set representing a master corpus into a plurality of node text data sets each representing a portion of the master corpus based at least in part on a predefined partitioning schema, wherein each node text data set of the plurality of node text data sets corresponds uniquely to a semantic search node of a plurality of semantic search nodes;

for each semantic search node of the plurality of semantic search nodes:

select, from a plurality of index structures associated with a semantic search process, an optimal index structure based at least in part on hyperparameters associated with the plurality of index structures; and generate a node index based at least in part on the node text data set corresponding to the semantic search node according to the selected optimal index structure;

store the plurality of node indexes in a node index store as a file in a columnar file format comprising a table in which each of the node indexes is stored as a corresponding column of binary values;

for each semantic search node of the plurality of semantic search nodes, load the corresponding node index from the node index store into a persistent node index cache of the semantic search node, wherein the node index persists independently with respect to distinct executions of a corresponding instance of a semantic search;

receive a query vector representing input for the semantic search over the master corpus;

at each semantic search node of the plurality of semantic search nodes, generate a node results set representing output of the semantic search over the portion of the master corpus represented by the node text data set corresponding to the semantic search node by executing an instance of a semantic search process based at least in part on the query vector and on the node index corresponding to the semantic search node; and generate a master results set representing output of the semantic search over the master corpus by combining a plurality of node results sets comprising the node results set generated at each semantic search node of the plurality of semantic search nodes.

2. The apparatus of claim 1, wherein each node results set of the plurality of node results sets comprises a top-k set of ranked results determined by the instance of the semantic search process corresponding to the semantic search node at which the node results set is generated, and combining the plurality of node results sets comprises determining a global top-k set of the ranked results from all of the node results sets in the plurality of node results sets based at least in part on similarity scores, wherein the global top-k set of the ranked results are determined after the node results sets are retrieved from persistent node index caches.

3. The apparatus of claim 1, wherein the predefined partitioning schema is configured such that the portion of the master corpus represented by each node text data set of the plurality of node text data sets is determined based at least in part on time data, region data, and/or categories associated with each discrete object in the master corpus.

4. The apparatus of claim 1, wherein generating the node index corresponding to each semantic search node of the plurality of semantic search nodes comprises:

generating, for each semantic search node of the plurality of semantic search nodes, a node vector set corresponding to the semantic search node based at least in part on the node text data set corresponding to the semantic search node by embedding text from the node text data set using a trained language model; and generating the node index corresponding to each semantic search node of the plurality of semantic search nodes based at least in part on the node vector set.

5. The apparatus of claim 4, wherein the at least one non-transitory memory and the program code are configured to, with the at least one processor, further cause the apparatus to at least:

tune the trained language model for optimal compatibility with the semantic search process based at least in part on hyperparameters and sample query data comprising labeled semantic search inputs.

6. The apparatus of claim 1, wherein the main text data set representing the master corpus comprises aggregated enterprise data collected by an enterprise management system with respect to one or more systems associated with an enterprise, the query vector is generated based at least in part on semantic search request input received via a semantic search request interface presented via the enterprise management system, and the enterprise management system, in response to receiving the master results set perform one or more enterprise management operations with respect to one or more systems associated with the enterprise based at least in part on the master results set.

7. A computer-implemented method comprising:

partitioning a main text data set representing a master corpus into a plurality of node text data sets each representing a portion of the master corpus based at least in part on a predefined partitioning schema, wherein each node text data set of the plurality of node text data sets corresponds uniquely to a semantic search node of a plurality of semantic search nodes;

for each semantic search node of the plurality of semantic search nodes:

selecting, from a plurality of index structures associated with a semantic search process, an optimal index structure based at least in part on hyperparameters associated with the plurality of index structures; and generating a node index based at least in part on the node text data set corresponding to the semantic search node according to selected optimal index structure;

storing the plurality of node indexes in a node index store as a file in a columnar file format comprising a table in which each of the node indexes is stored as a corresponding column of binary values;

for each semantic search node of the plurality of semantic search nodes, loading the corresponding node index from the node index store into a persistent node index cache of the semantic search node, wherein the node index persists independently with respect to distinct executions of a corresponding instance of a semantic search;

receiving a query vector representing input for the semantic search over the master corpus;

at each semantic search node of the plurality of semantic search nodes, generating a node results set representing output of the semantic search over the portion of the master corpus represented by the node text data set corresponding to the semantic search node by executing an instance of a semantic search process based at least in part on the query vector and on the node index corresponding to the semantic search node; and generating a master results set representing output of the semantic search over the master corpus by combining a plurality of node results sets comprising the node results set generated at each semantic search node of the plurality of semantic search nodes.

8. The method of claim 7, wherein each node results set of the plurality of node results sets comprises a top-k set of ranked results determined by the instance of the semantic search process corresponding to the semantic search node at which the node results set is generated, and combining the plurality of node results sets comprises determining a global top-k set of the ranked results from all of the node results sets in the plurality of node results sets based at least in part on similarity scores, wherein the global top-k set of the ranked results are determined after the node results sets are retrieved from persistent node index caches.

9. The method of claim 7, wherein the predefined partitioning schema is configured such that the portion of the master corpus represented by each node text data set of the plurality of node text data sets is determined based at least in part on time data, region data, and/or categories associated with each discrete object in the master corpus.

10. The method of claim 7, wherein generating the node index corresponding to each semantic search node of the plurality of semantic search nodes comprises:

generating, for each semantic search node of the plurality of semantic search nodes, a node vector set corresponding to the semantic search node based at least in part on the node text data set corresponding to the semantic search node by embedding text from the node text data set using a trained language model; and generating the node index corresponding to each semantic search node of the plurality of semantic search nodes based at least in part on the node vector set.

11. The method of claim 10, further comprising tuning the trained language model for optimal compatibility with the semantic search process based at least in part on hyperparameters and sample query data comprising labeled semantic search inputs.

12. A computer program product comprising at least one non-transitory computer-readable storage medium having computer-readable program code portions stored therein, the computer-readable program code portions comprising an executable portion configured to:

partition a main text data set representing a master corpus into a plurality of node text data sets each representing a portion of the master corpus based at least in part on a predefined partitioning schema, wherein each node text data set of the plurality of node text data sets corresponds uniquely to a semantic search node of a plurality of semantic search nodes;

for each semantic search node of the plurality of semantic search nodes:

select, from a plurality of index structures associated with a semantic search process, an optimal index structure based at least in part on hyperparameters associated with the plurality of index structures; and generate a node index based at least in part on the node text data set corresponding to the semantic search node according to the selected optimal index structure;

store the plurality of node indexes in a node index store as a file in a columnar file format comprising a table in which each of the node indexes is stored as a corresponding column of binary values;

for each semantic search node of the plurality of semantic search nodes, load the corresponding node index from the node index store into a persistent node index cache of the semantic search node, wherein the node index persists independently with respect to distinct executions of a corresponding instance of a semantic search;

receive a query vector representing input for the semantic search over the master corpus;

at each semantic search node of the plurality of semantic search nodes, generate a node results set representing output of a semantic search over the portion of the master corpus represented by the node text data set corresponding to the semantic search node by executing an instance of a semantic search process based at least in part on the query vector and on the node index corresponding to the semantic search node; and generate a master results set representing output of a semantic search over the master corpus by combining a plurality of node results sets comprising the node results set generated at each semantic search node of the plurality of semantic search nodes.

* * * * *